(12) United States Patent
Shu et al.

(10) Patent No.: US 8,977,292 B2
(45) Date of Patent: Mar. 10, 2015

(54) POSITIONING ACCURACY ESTIMATION (75) Inventors: Edison Shu, Shanghai (CN); Yang Zhang, Shanghai (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 178 days.

(21) Appl. No.: 13/884,251

(22) PCT Filed: Apr. 5, 2012

(86) PCT No.: PCT/CN2012/073519
§ 371 (c)(1),
(2), (4) Date: May 8, 2013

(87) PCT Pub. No.: WO2013/149378
PCT Pub. Date: Oct. 10, 2013

(65) Prior Publication Data
US 2013/0310066 A1   Nov. 21, 2013

(51) Int. Cl.
G01S 5/10       (2006.01)
H04W 64/00   (2009.01)
G01S 5/02       (2010.01)

(52) U.S. Cl.
CPC ................ G01S 5/10 (2013.01); H04W 64/00 (2013.01); G01S 5/0252 (2013.01)
USPC ...................... 455/456.1; 455/423; 455/67.11

(58) Field of Classification Search
CPC .................................. G01S 5/10; H04W 64/00
USPC ..................... 455/456.1, 423, 67.11; 342/451
See application file for complete search history.

(56) References Cited

U.S. PATENT DOCUMENTS

2004/0203856 A1   10/2004   Wigren et al.
2007/0049267 A1   3/2007   Kota et al.
(Continued)

FOREIGN PATENT DOCUMENTS

CN   101352061 A   1/2009
CN   102186239 A   9/2011
(Continued)

OTHER PUBLICATIONS

International Search Report for PCT/CN2012/073519, mailed on Jan. 17, 2013.
T. Wigren; "Adaptive enhanced cell ID fingerprinting localization by clustering of precise position measurements"; Ericsson AB, Stockholm, Sweden. Jan. 2, 2006, 12 pp.
(Continued)

*Primary Examiner* — Kashif Siddiqui
*Assistant Examiner* — Minjung Kim
(74) *Attorney, Agent, or Firm* — Myers Bigel Sibley & Sajovec, P.A.

(57) ABSTRACT

A method for fingerprinting positioning decision support includes obtaining a geographic distribution probability of positions of measurement. A first collection of simulated measurements according to a signal model is generated, wherein each simulated measurement is associated with a respective pixel. The signal model is based on base stations located in the area. Fingerprinting positioning reference data is computed from the first collection and positions of the selected pixels. A second collection of simulated measurements is generated, which is statistically independent to the first collection. These simulated measurements are associated with a respective intended position within the area. Fingerprinting positioning is performed by the second collection utilizing the computed fingerprinting positioning reference data. An estimated accuracy of the fingerprinting positioning is calculated using a comparison between the intended position and the estimated position. This is made to evaluate positioning capabilities of fingerprinting positioning based on the measurement strategy.

16 Claims, 5 Drawing Sheets

(56) References Cited

U.S. PATENT DOCUMENTS

2010/0103048 A1    4/2010  Bamberger et al.
2011/0065450 A1*  3/2011  Kazmi ........................ 455/456.1

FOREIGN PATENT DOCUMENTS

| | | |
|---|---|---|
| EP | 2141957 A1 | 1/2010 |
| WO | WO 2008/022076 A2 | 2/2008 |
| WO | WO 2009/155987 A1 | 12/2009 |

OTHER PUBLICATIONS

3GPP TR 25.215 V6.4.0 (Sep. 2005) Technical Specification; 3$^{rd}$ Generation Partnership Project; Technical Specification Group Radio Access Network; Physical Layer—Measurements (FDD); (Release 6). (Sep. 2005), 18 pp.

3GPP TR 25.907 V9.0.1 (Jan. 2010) Technical Report; 3$^{rd}$ Generation Partnership Project; Technical Specification Group Services and System Aspects; Evaluation of path-loss technologies for Location Services (LCS); (Release 9). (Jan. 2010), 35 pp.

* cited by examiner

POSITIONING ACCURACY ESTIMATION

CROSS REFERENCE TO RELATED APPLICATION

This application is a 35 U.S.C. §371 national stage application of PCT International Application No. PCT/CN2012/073519, filed in the English language on 5 Apr. 2012, the disclosure of which is incorporated by reference herein in its entirety.

TECHNICAL FIELD

The present invention relates in general to fingerprinting positioning and in particular to estimation of possible achievable performance by such fingerprinting positioning.

BACKGROUND

The present invention generally relates to fingerprinting positioning technologies which is now widely used and also discussed e.g. during 3GPP standardization. Also known as e.g. "radio pattern matching" or "radio signature", fingerprinting positioning technologies represent a family of substantially path loss based technologies that rely on matching the Radio Frequency (RF) environment, as experienced by the User Equipment (UE), to the known characteristics of the larger RF system in which the UE is operating. Information from the UE, including measurements of neighbour cell signal strengths, time delay and other network parameters form the basis of the RF environment to be compared to the established system RF database. The intent of this approach is to mitigate the negative impacts of anomalies within the RF environment that challenge the accuracy of trilateration technologies, e.g. multipath and reflection.

The RF fingerprinting positioning method is based on measurements made by the UE and the Radio Base Station (RBS). The essential measurement set required for such method is currently defined in 3GPP TS 25.215 [1] and necessary for the basic mobility functionality and hence this method will work with existing mobiles without any modification.

There are growing market segments for location services that require both location accuracy and user transparency. Government Surveillance and Lawful Intercept put requirements on the positioning or tracking of individuals or groups by government or authority organizations, typically for the purpose of security. Due to the user transparency, these services cannot be addressed with location technologies which require UE support or modification, such as Assisted Global Positioning System (A-GPS), Global Navigation Satellite System (GNSS), and Observed Time Difference Of Arrival (OTDOA). Additionally, emergency service applications require a level of location accuracy which has not yet been met with Cell IDentity (Cell-ID) and Round Trip Time (RTT) methods. The potential benefits of RF fingerprinting and the relative ease with which this location method can be adopted in the Universal Mobile Telecommunication System (UMTS) Terrestrial Radio Access Network (UTRAN) would indicate that it is appropriate that the technology would be included in the UTRAN in support of the services noted above, as well as for cooperative deployment with satellite-based systems (A-GPS, GNSS, etc.) in support of "hybrid" location technology for Location Based Services (LBS).

Fingerprinting positioning algorithms in Global System for Mobile communications (GSM)/Wideband Code Division Multiple Access (WCDMA)/Long-Term Evolution (LTE) operate by creating a radio fingerprint for each point of a fine coordinate grid that covers the Radio Access Network (RAN). Each such measurement must be associated with an identity (ID) of a RBS. The fingerprint may e.g. comprise:

- The cell IDs that are detected by the UE, in each grid point.
- Quantized path loss or signal strength measurements, with respect to multiple RBSs, performed by the UE, in each grid point.
- Quantized RTT, in WCDMA, or Timing Advance (TA), in GSM and LTE, or UE Receiver-Transmitter (UERx-Tx) time difference (in LTE) in each grid point.
- Quantized noise rise, representing the load of a Code Division Multiple Access (CDMA) system, in each grid point.
- Quantized signal quality e.g. Received signal Quality (Rx-Qual) in GSM, Ec/NO in WCDMA and Reference Signal Received Quality (RSRQ) in LTE.
- Radio connection information like the Radio Access Bearer (RAB).
- Quantized time.

Whenever a position request arrives, a radio fingerprint is first measured, after which the corresponding grid points with similar characteristic are looked up and a location estimate is calculated and reported.

Adaptive Enhanced Cell ID (AECID) is one kind of fingerprinting positioning technology that refines the basic cell identity positioning method in a variety of ways, see e.g. T. Wigren in "Adaptive enhanced cell ID fingerprinting localization by clustering of precise position measurements", IEEE Trans. Veh. Tech., vol. 56, pp. 3199-3209, 2007 [2]. The AECID positioning method is based on the idea that high precision positioning measurements, e.g. A-GPS measurements, can be seen as points that belong to regions where certain cellular radio propagation condition persist. The preparation of a database for AECID positioning is performed in three basic steps.

In a first step, A-GPS positioning, or any other available high-precision positioning, is performed at the same time as UE network signal measurement. The AECID positioning method introduces a tagging of the high precision measurements according to certain criteria, e.g. including:

- The cell IDs that are detected by the UE.
- Quantized path loss or signal strength measurements, with respect to multiple RBSs, performed by the UE.
- Quantized RTT, TA or UE Rx-Tx time difference.
- Quantized noise rise.
- Quantized signal quality e.g. RxQual, Ec/NO or RSRQ.
- Radio connection information like the RAB.
- Quantized time.

It is important to note that the tag consist of a vector of indices, where each index taking an enumerable number of discrete values. Continuous variables used for tagging, like path loss, hence need to be quantized.

In a second step, all high precision positioning measurements that have the same tag are collected in separate high precision measurement clusters. Further processing of the clusters is performed in order to refine the position definition, i.e. an associated geographical region. The geographical regions can be smaller than the extension of a cell of the cellular system.

In a third step, a polygon that represents the geographical extension of a cluster is computed for each stored high precision position measurement cluster. The two most pronounced properties of this particular algorithm include that the area of the polygon is minimized, i.e. that the accuracy hence is maximized, and that the probability that the terminal is within the polygon, i.e. the confidence, is precisely known, since it is set as a constraint in the algorithm.

For an incoming positioning request, the UE's network measurement is first obtained. By looking up cell IDs or tags, the polygon corresponding to the determined tag is then looked up in the tagged database of polygons, followed by a reporting, e.g. over the Radio Access Network Application Part (RANAP) using the polygon format.

The accuracy of AECID positioning could be affected by a number of factors. The criteria of tagging is one important parameter. For example, tagging with serving cell ID and TA is expected to provide more information than tagging only with serving cell ID. This would thus provide higher accuracy. The selection of criteria may vary from implementations to implementations.

The quality of the collected high accuracy positioning measurements used to generate the tagged polygons is also of importance. In ideal cases, it is expected that those high accuracy positioning measurements are evenly distributed over the whole target area, but in real cases, it is quite difficult to fulfil this. Usually, a driving test is performed and the operator uses tools such as e.g. TEMS™ to collect data along the road. The collected data is then used for AECID. Thus, the data collection frequency, i.e. how much data is collected every second, or the density of roads available for cars may highly affect the expected accuracy of AECID.

The distribution of the cells and the RBS sites within the cells is also of importance. It is intuitive that the smaller the Inter Site Distance (ISD) between sites is, the high accuracy is expected. Another aspect might be that the area covered by sectored-cells might rise to higher accuracy than the area covered by omni-cells. For instance, AECID is expected to perform better in urban areas than rural areas.

All these aspects make it difficult to foresee the possible accuracy that might be achieved by fingerprinting positioning with a certain cell planning in a certain area. An operator thus has large difficulties in deciding whether or not it is sufficient to deploy fingerprinting positioning methods, such as AECID, to fulfil accuracy requirements, unless the positioning method is implemented and the actual achieved accuracy is measured. Questions like whether or not the AECID should be deployed only in urban area, or how many roads that shall be covered to achieve a certain accuracy, are difficult to answer beforehand.

SUMMARY

An object of the present invention is to achieve a method for fingerprinting decision support giving an estimate of an accuracy of a fingerprinting positioning obtainable by a certain measurement strategy and a certain signal model. The object is achieved by methods and systems according to the independent claims. Preferred embodiments are defined in dependent claims. In general words, in a first aspect, a method for fingerprinting positioning decision support comprise obtaining a geographic distribution probability of positions of measurement according to a measurement strategy. A first collection of simulated measurements according to a signal model is generated, wherein each simulated measurement in the first collection is associated with a respective pixel selected in dependence on the geographic distribution probability. The signal model is based on at least base stations located in the area or to be located in the area. Fingerprinting positioning reference data is computed from the first collection of simulated measurements and positions of the selected pixels. A second collection of simulated measurements according to the signal model is generated, wherein the second collection is statistically independent to the first collection. The simulated measurements of the second collection are associated with a respective intended position within the area. Fingerprinting positioning is performed by the second collection of simulated measurements utilizing the computed fingerprinting positioning reference data, giving respective estimated positions. An estimated accuracy of the fingerprinting positioning obtainable by the measurement strategy is calculated using a comparison between the intended position and the estimated position for each of the measurements of the second collection. This is made for evaluating positioning capabilities of fingerprinting positioning based on the measurement strategy.

In a second aspect, a system for fingerprinting positioning decision support comprises a processor, an input for geographical data, an input for cell planning data and an output. The input for geographical data is connected to the processor. The input for geographical data is configured for obtaining a geographical data of an area to be covered by the fingerprinting positioning. The input for cell planning data is connected to the processor. The output is connected to the processor, for an estimated accuracy of a fingerprinting positioning. The processor is configured for obtaining a geographic distribution probability of positions of measurement according to a measurement strategy. The processor further comprises a measurement simulator. The measurement simulator is configured for generating a first collection of simulated measurements according to a signal model. Each simulated measurement in the first collection is associated with a respective pixel selected in dependence on the geographic distribution probability. The signal model is based on at least base stations located in the area or to be located in the area. The measurement simulator is further configured for generating a second collection of simulated measurements according to the signal model. The second collection is statistically independent to the first collection. Each signal of the second collection is associated with a respective intended position within the area. The processor further comprises a fingerprinting positioning part. The fingerprinting positioning part is configured for computing fingerprinting positioning reference data from the first collection of simulated measurements and positions of the associated pixels. The fingerprinting positioning part is further configured for performing fingerprinting positioning by the second collection of simulated measurements utilizing the computed fingerprinting positioning reference data, giving respective estimated positions. The processor is further configured for calculating the estimated accuracy of the fingerprinting positioning obtainable by the measurement strategy, using a comparison between the intended position and the estimated position for each of the simulated measurements of the second collection.

One advantage with the present invention is that it gives a method to relative reliably predict the achievable fingerprinting positioning accuracy in a operator-designated area, before doing any fingerprinting positioning deployment or driving test. The method is of low complication and could be used for all fingerprinting-like positioning methods. Other advantages are discussed in connection with different embodiments described further below.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

As briefly discussed in the background section, an expected accuracy of a positioning system depends on a number of more or less complex factors. Most of the most important factors are, however, to some extent a connection either with the measurement strategy used when collecting data on which the positioning database is based or on the actual cell planning. It has thus been realized that if such parameters are postulated, at least to some extent, a full simulation of the building-up of a data base as well as of the actual positioning using that database can be performed with a reasonable credibility. An estimate of a possibly reachable accuracy of the fingerprinting positioning method can in such a way be achieved, which would be of tremendous assistance for further planning of the communication system and in particular of the positioning systems.

Figure 1:
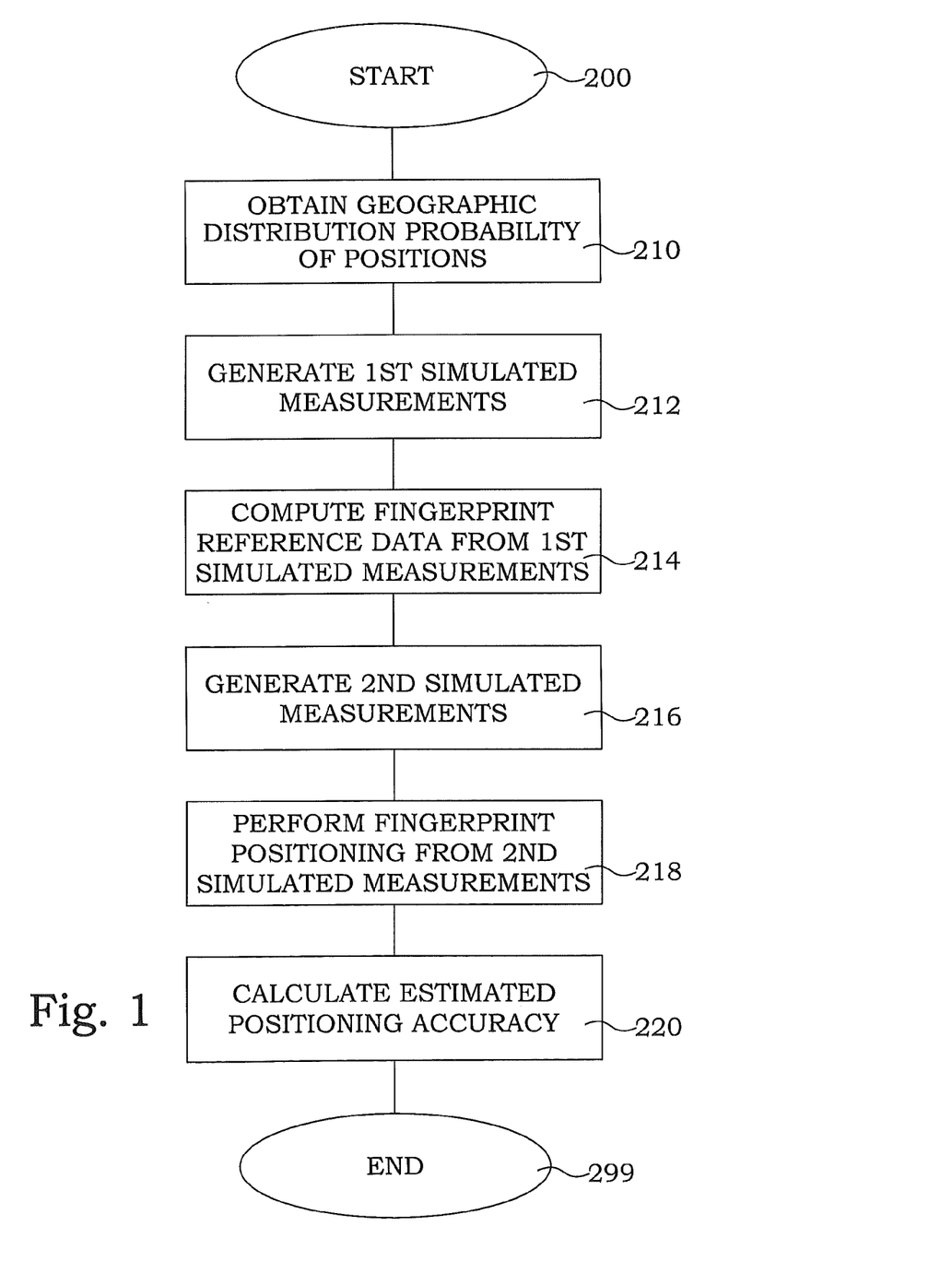
FIG. 1 is a flow diagram of steps of an embodiment of a method for fingerprinting positioning decision support.

FIG. 1 illustrates a flow diagram of steps of an embodiment of a method for fingerprinting positioning decision support. The method for fingerprinting positioning decision support starts in step 200. In step 210, a geographic distribution probability of positions of measurement according to a measurement strategy is obtained. A first collection of simulated measurements according to a signal model is generated in step 212. Each simulated measurement in the first collection is associated with a respective pixel selected in dependence on the geographic distribution probability. The signal model is based on at least base stations located in the area or to be located in the area. In step 214, fingerprinting positioning reference data is computed from the first collection of simulated measurements and positions of the selected pixels. A second collection of simulated measurements according to said signal model is generated in step 216. The second collection is statistically independent to the first collection. Each signal of the second collection is associated with a respective intended position within the area. In step 218, fingerprinting positioning by the second collection of simulated measurements is performed utilizing the computed fingerprinting positioning reference data. This gives respective estimated positions. An estimated accuracy of the fingerprinting positioning that is obtainable by the measurement strategy is calculated in step 220. This calculation is made using a comparison between the intended position and the estimated position for each of the measurements of the second collection. In this way, positioning capabilities of fingerprinting positioning based on the measurement strategy are evaluated. The method ends in step 299.

In order to achieve some kind of understanding of the basic ideas, a particular embodiment is first described as an exemplifying illustration. In this particular exemplary embodiment, an AECID positioning method is to be evaluated. Based on a terrain map of the certain area in which the evaluation is to be performed, the routes in the area which is expected to be covered by driving test are picked up. This could in this particular embodiment be done by using a digital map. Existing conventional image processing methods are applied to outline the roads. If there has already been a field test in that area, the easiest way is just to use the previous GPS route log.

With the available cell data, "high accuracy measurements" are generated on the roads to simulate a driving test. These "high accuracy measurements" are based on a propagation model and other network configurations. In this particular embodiment, the measurement generation considers random fluctuation of signal strength and the minimum access signal level.

At least a part of the "high accuracy measurements" are utilized for creating the databases on which the AECID positioning is based, i.e. polygons are generated based on the high accuracy measurements. The measurements for test purpose i.e. the actual accuracy CDF simulation are also generated in a similar way, and can even be a second part of the same "high accuracy measurements", as long as the measurements are statistically independent with respect to the measurements used for creating the databases. An AECID positioning is performed to get an accuracy Cumulative Distribution Function (CDF).

If there has already been a field test in the target area, the CDF difference between real accuracy and the simulated one, i.e. accuracy bias, can be found out. The whole model and accuracy bias, if available, can be applied to another area which has similar terrain and cell planning while with unknown AECID accuracy.

In the above presented embodiment, AECID was used as fingerprinting positioning method. However, the present invention is not in its general version limited to AECID. Instead, different kinds of other fingerprinting positioning methods are applicable as well.

An important part of the present ideas is the obtaining of a geographic distribution probability. The preferred approach to manage to do this is to obtain a digital map of an area to be covered by said fingerprinting positioning. This digital map could be based on e.g. a cell planning map used by the operator or in a most simple way a screen shot of any online map. The map is then processed concerning measurement probabilities. Each pixel of the digital map is given a certain value, associated with a measurement probability according to the intended measurement strategy. This can be achieved in different ways. One input to the process comes preferably from the map itself. Names appearing at the map are preferably removed. Areas, unlikely or impossible to be entered by humans, such as e.g. where the terrain is impenetrable, lakes without essential boat traffic or hazardous industry areas, are preferably removed or at least given a minimum probability. Roads, which are the most likely places for performing measurements, can be identified digitally from the map and given a high probability. Additional information, such as e.g. if certain roads are closed, too small for ordinary vehicles, one-way roads etc. can further be utilized to refine the estimation of the measurement probability.

In a particular embodiment, the probability is set to either 1 or 0, i.e. the value of said pixels is a binary value. This means that a first value, typically "0", represents pixels associated with positions where measurement is intended to be made and a second value, typically "1", represents pixels associated with positions where measurement is not intended to be made, according to said measurement strategy. In alternative embodiments, the meaning of "0" and "1" may be exchanged and furthermore, any symbols or values representing a binary value can be utilized.

Figure 2A:
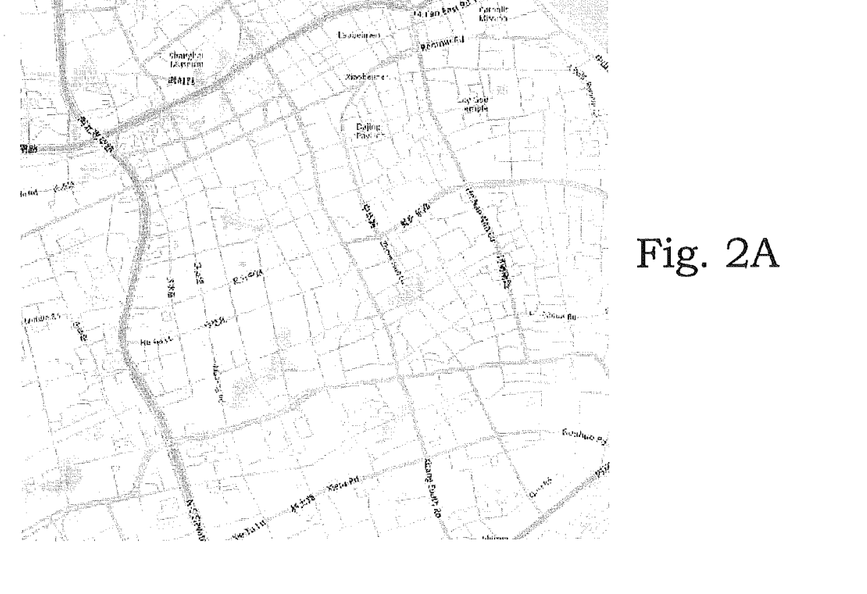
FIG. 2A is a map.
Figure 2B:
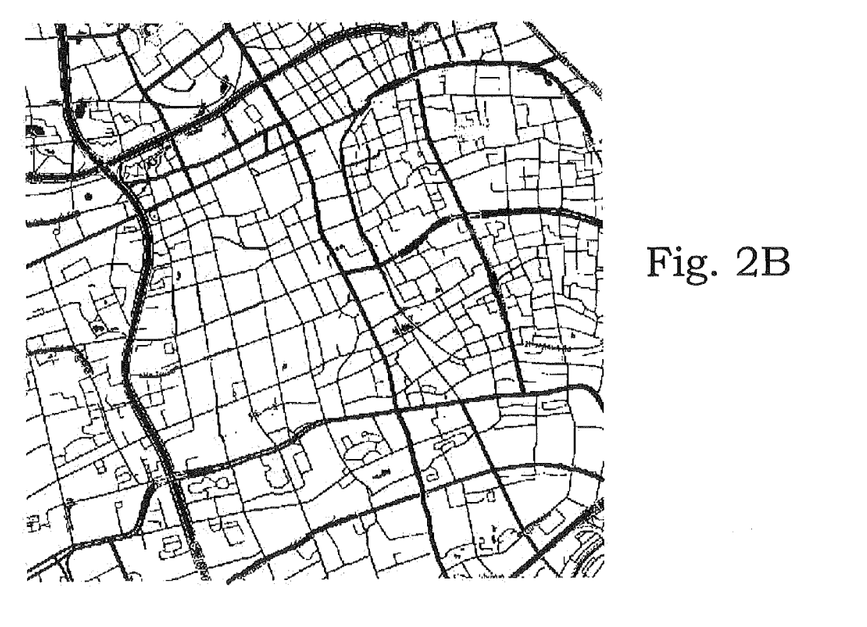
FIG. 2B is the map of FIG. 2A processed for finding roads available for driving tests.

In a further particular embodiment, the pixels corresponding to roads of the digital map are given the first value. It is in such an embodiment assumed that most roads are available for a driving test. In fact, in most real cases, a driving test is utilized for collecting measurements for creating the fingerprinting databases, e.g. high accuracy measurements for performing AECID. The route could as mentioned above be simulated by using the digital map or a screen shot of online map processed by image processing methods, FIGS. 2A and 2B illustrate such a processing. In FIG. 2A, a screen shot of a terrain map of RGB is presented. By image processing, this screen shot is converted to a binary map, illustrated in FIG. 2B, with roads given the pixel value of "0" and non-roads the pixel value of "1".

If the actual planned driving test is known, i.e. when the measurement strategy is a particular driving test, preferably, the pixels of the digital map corresponding to roads accessible by that particular driving test are given the first pixel value. Every pixel of the map is matched with a pair of Latitude/Longitude. The pixel of "0" (black) is considered as the designed route.

In yet another embodiment, more generally, a black/white pixel map can be replaced by e.g. existence probability of subscribers (or positioning targets) in a network at that specific area. The simulated measurements and their locations are generated based on the geographical distribution of the existence probability. One example of location generation may be to generate more densely distributed measurements for high existence probability areas. The geographical density can be a linear or non-linear function of existence probability.

In a more developed embodiment, the solution based on image processing, which is relative rough and used to minimize the required resource, can be further refined. If more Geographic Information System (GIS) data are available, for example, the start or stop latitude and longitude of roads, the latitude and longitude and coverage of some big buildings, it is possible to build up data based on this information rather than just a plain image.

In one preferred embodiment, the signal model is based on at least a propagation model. The signal model is thereby dependent on an intended position and the base station locations. Each simulated measurement associates a fingerprint to each selected pixel. The fingerprint can e.g. comprise serving cell ID and/or signal strength etc. based on the propagation model. Also other parameters may be of interest. In fingerprinting positioning in general, and in AECID in particular, it is considered to be advantageous to use criteria such as heard cells, received signal strength/quality, and the time related parameters (TA in GSM, RTT in WCDMA, UERxTx Time in LTE etc). With the knowledge of the cell data, such parameters can be easily simulated for every point. Heard cells and related signal strength/quality could be simulated by popular propagation model such as Cost231-Hata, Standard Propagation Model (SPM) or Standard Macrocell Model (SMM) which are frequently used in cell planning and related researches. It would be even better if such model and terrain attributes for the target area are calibrated during the phase of cell planning, which could bring the simulation closer to the real environment. If there has already been AECID field test in the target area, the collected measurement data can be used for propagation model calibration purposes. For time related parameters, it could be simulated based on the field test results of such parameter.

In three different preferred embodiments, which also can be combined, the signal model is further dependent on environment characteristics, minimum signal level for access and terminal type, respectively.

In three different preferred embodiments, which also can be combined, the simulated measurements comprise received signal strength, received signal quality, and propagation time related parameters.

As the complication of the real environment, the above parameters could fluctuate a lot from time to time. So it is a preferred embodiment to let the signal model consider the impact of random fluctuation of signal strength and minimum access signal level. Error should preferably be added to the measurements to better conform to the real environment. Signal strength error distribution can preferably use any one of:
Rayleigh distribution,
Rician distribution, and
Gaussian distribution.

The signal strength error distribution can also use any other statistical distribution obtained from historical data within a certain area.

Note that in order to better reflect the non-ideal propagation, error characteristic can be:
cell specific,
geographical area specific,
terrain specific,
GIS data specific, or
time specific (i.e. old and new errors are with different characteristic due to e.g. cell replanning).

Figure 3:
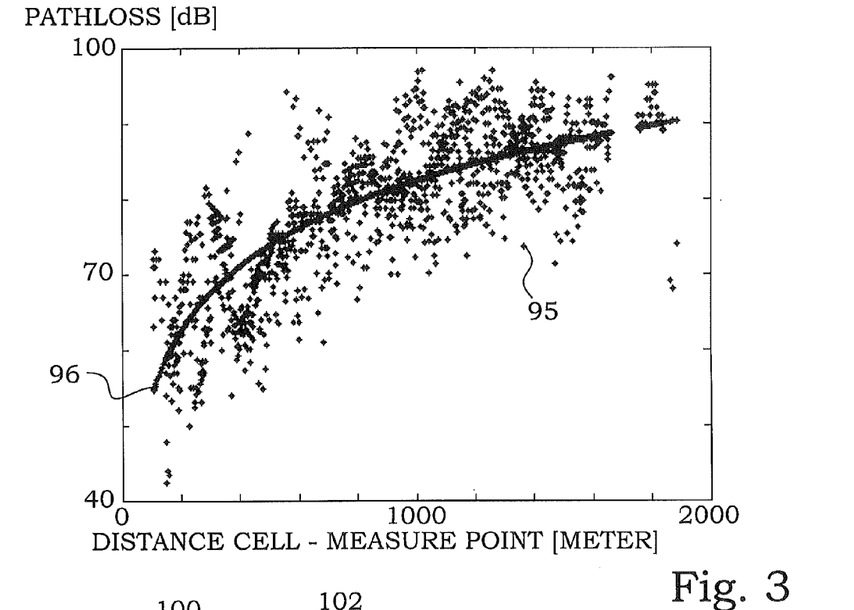
FIG. 3 illustrates the fluctuation of path loss and estimation using calibrated propagation models.

FIG. 3 illustrates the fluctuation of path loss and estimation using calibrated propagation models. The points 95 represent real measurements and the points 96 represent estimated measurements After the generation of the simulated measurements, the fingerprinting positioning databases can be constructed. This is performed in the respective standard ways, just as for real measurements.

In a particular embodiment, initiation of AECID could be performed after the generation of high accuracy measurements. To this end, polygons could be generated based on the implementation of the "tagging criteria" and the generated high accuracy measurement. Depending on the available measurements, different tagging divisions can be obtained. In general, the more detailed the tagging is, the smaller becomes the associated polygon. A smaller polygon means a high positioning accuracy. On the other hand, it is not useful to simulate measurements that the actual UEs cannot perform. The most appropriate selection of tagging parameters should therefore preferably correspond to the expected measurement possibilities for a UE used in the cellular communication system.

Figure 4:
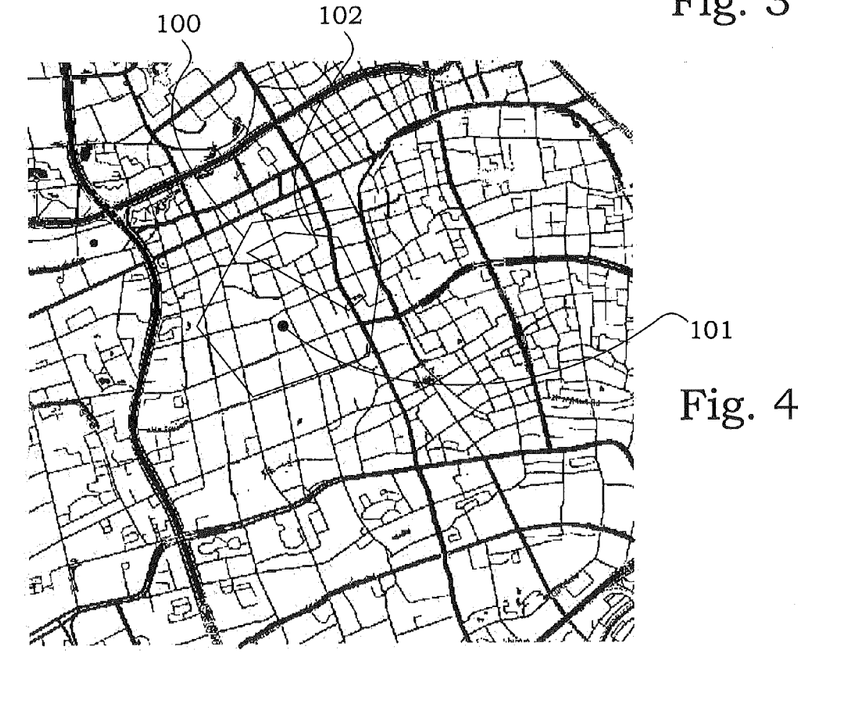
FIG. 4 illustrates an example of the difference in polygon shape and polygon size for different tagging parameters in AECID.

FIG. 4 gives an example of the difference in polygon shape and polygon size for different tagging parameters. A first polygon 100 is created for a tagging based only on the "serving cell ID". The RBS 101 of the serving cell is located in the interior of the first polygon 100. The polygon 100 resembles the extent of the serving cell. If instead the tag is based on both the serving cell and a quantized value of TA (in a GSM system), a smaller polygon 102 is associated with a tag of the serving cell ID and a particular quantized TA. This polygon is considerably smaller than the serving cell area and results therefore in a more accurate position determination. It can also be noted that for the selected TA value, the RBS is situated outside the polygon 102.

When the fingerprinting positioning database is prepared, based on the first collection of simulated measurements, a position request session can start. Positions are selected, for which new simulated measurements are provided. The selection of positions can be performed according to different lines. The choice of positions may influence the final result somewhat, but at the same time, the complexity of the selection criteria should preferably also be kept low. There will thus be some kind of trade-off between reliability and simplicity, and also in view of the information that is available.

In one preferred embodiment, the expected user behaviour and/or the expected user distribution is utilized. If a position distribution similar to the one that will be present in the final communication system can be estimated, the corresponding positioning will also be a good estimation of the actual positioning in the system to be developed. If no detailed information about such parameters is known, estimations based on e.g. the map features, or randomly, or in the related hotspots etc. can be used In one preferred embodiment, where simplicity is appreciated, the generation of the second collection of simulated measurements is performed for pixels selected in dependence on the same geographic distribution probability as used for the generation of the first collection of simulated measurements.

It is important to realize that the first and second collections of simulated measurements have to be statistically independent relative each other. This is particularly true if the same criteria for selection of measurement points are used for both cases. In practice this typically means that the simulated measurements of one of the collections cannot be utilized in the other, and vice versa. They could in fact be generated together in one and the same simulation run, but the individual simulated measurements then have to be divided to be comprised in either of the collections, not in both.

From the simulated measurements, a bunch of AECID or generally fingerprinting positioning results could be achieved as the output of the simulation system. By comparing these simulated measurements with the positions they were supposed to reflect, an operator could get the estimation of the accuracy of AECID or other fingerprinting positioning in the target area.

Figure 5:
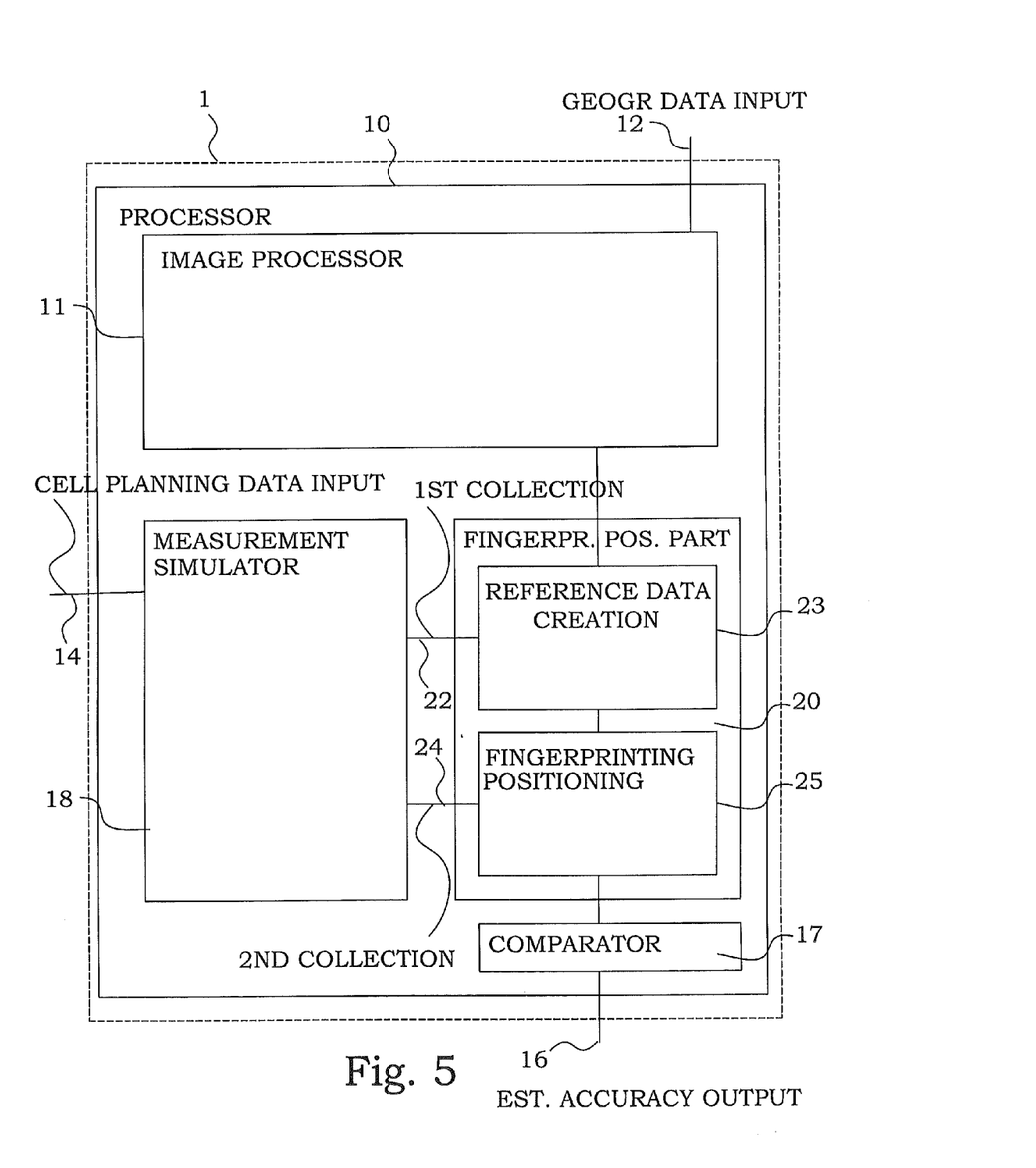
FIG. 5 illustrates schematically an embodiment of a system for fingerprinting positioning decision support.

FIG. 5 illustrates schematically an embodiment of a system for fingerprinting positioning decision support 1. The system comprises a processor 10, two inputs and an output 16. An input for geographical data 12 is connected to the processor 10. The input for geographical data 12 is configured for obtaining a geographical data of an area to be covered by the fingerprinting positioning. An input for cell planning data 14 is connected to the processor 10. The output 16 is connected to the processor 10, for forwarding an estimated accuracy of a fingerprinting positioning.

The processor 10 is configured for obtaining a geographic distribution probability of positions of measurement according to a measurement strategy, in this embodiment by an image processor 11. Other types of processing can be used in alternative embodiments, depending on the form of the geographical data. The processor 10 further comprises a measurement simulator 18. The measurement simulator 18 is configured for generating a first collection 22 of simulated measurements according to a signal model. Each simulated measurement in the first collection 22 is associated with a respective pixel selected in dependence on the geographic distribution probability. The signal model is based on at least base stations located in the area or to be located in the area. The measurement simulator 18 is further configured for generating a second collection 24 of simulated measurements according to the signal model. The second collection 24 is statistically independent to the first collection 22. Each simulated measurement of the second collection 24 is associated with a respective intended position within the area.

The processor 10 further comprises a fingerprinting positioning part 20. The fingerprinting positioning part 20 is configured for computing fingerprinting positioning reference data from the first collection 22 of simulated measurements and positions of associated pixels. In the present embodiment, this is performed in a reference data creation section 23. The fingerprinting positioning part 20 is further configured for performing fingerprinting positioning by the second collection 24 of simulated measurements utilizing the computed fingerprinting positioning reference data. In the present embodiment, this is performed in a fingerprinting positioning section 25. This gives respective estimated positions.

The processor 10 is further configured for calculating the estimated accuracy of the fingerprinting positioning obtainable by the measurement strategy, using a comparison between the intended position and the estimated position for each of the simulated measurements of the second collection. In the present embodiment, this is performed in a comparator 17. This estimate is provided at the output 16.

Figure 6:
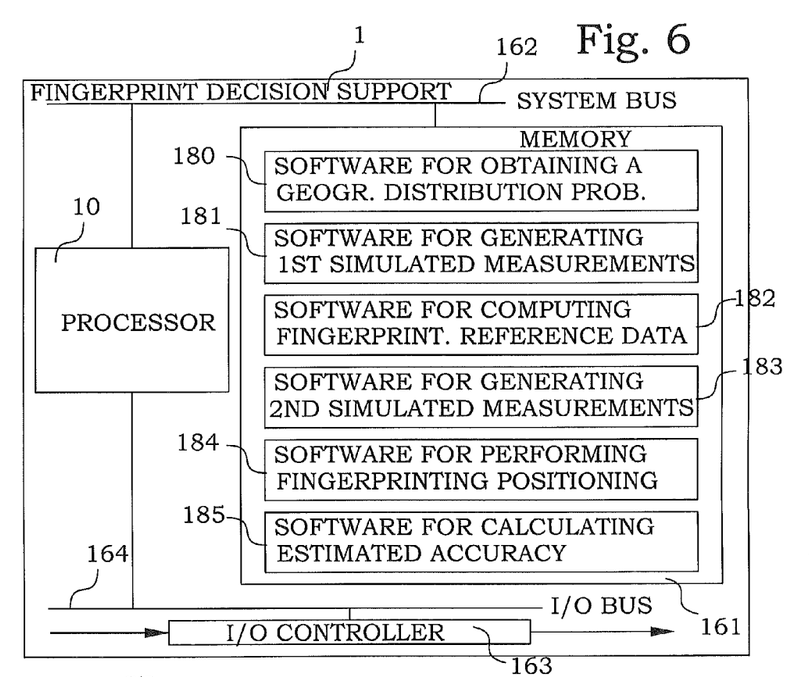
FIG. 6 is a block diagram illustrating an example embodiment of a system for fingerprinting positioning decision support.

As an implementation example, FIG. 6 is a block diagram illustrating an example embodiment of a system for fingerprinting positioning decision support 1. This embodiment is based on a processor 10, for example a micro processor, a memory 161, a system bus 162, an input/output (I/O) controller 163 and an I/O bus 164. In this embodiment the geographical data and cell planning data is received by the I/O controller 163 and stored in the memory 161. The I/O controller 163 also controls the issue of the estimated accuracy of a fingerprinting positioning. The processor 10 executes a software component 180 for obtaining a geographic distribution probability, a software component 181 for performing a generation of a first collection of simulated measurements, a software component 182 for computing fingerprinting positioning reference data, a software component 183 for generating a second collection of simulated measurements, a software component 184 for performing fingerprinting positioning and a software component 185 for calculating an estimated accuracy. Software components 181 and 183 together correspond to the measurement simulator 18 (FIG. 5) and software components 182 and 184 together correspond to the fingerprinting positioning part 20 (FIG. 5). This software is stored in the memory 161. The processor 160 communicates with the memory 161 over the system bus 162.

Note that as the simulation is based on the virtual data generation, there might be errors between the estimation and the real case. So an offset might be involved to get better estimation. Therefore in a preferred embodiment, a method for fingerprinting positioning decision support further comprises calibrating of the estimated accuracy by a bias. The bias is computed by comparing estimated accuracy from simulations and real measured accuracy in a comparison area where both are available.

Although errors have been added to the simulation model described in above section, some bias between the simulation result and the real environment is normally inevitable. The size of the bias may, however, differ between different cases. The bias may typically be due to a gap between propagation model and signal level trend in reality or a gap between the simulated signal strength fluctuation (Rayleigh/Rician/Gaussian) and the reality. The bias may also be due to unpredictable cell reselections and/or handovers or an unpredictable neighbour cell list definition. In a preferred embodiment, a calibration is needed or at least preferred to predict the accuracy more precisely.

Such calibration can be based on former field test of areas with similar cell planning, e.g. RBS distance, cell coverage, etc., and with similar terrain environment.

Figure 7:
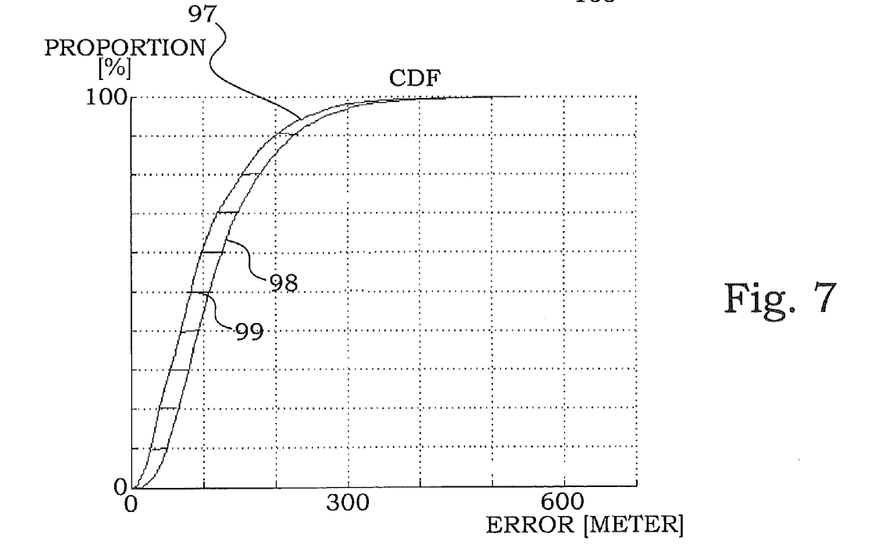
FIG. 7 is a diagram illustrating a bias of simulation results.

Such a calibration can be performed as follows. Apply the accuracy simulation model described here above on a reference area where field test has already been performed before. The reference area terrain environment and cell planning shall be as similar as possible to the target simulation area. Compare the field test result with the simulation result of the reference area and decide the bias between the two results. Add the bias on the simulation result to improve the prediction of the AECID result or any other fingerprinting positioning result of the target area. An example of such a biasing is illustrated in FIG. 7, where the curve 97 denotes the simulation result CDF, curve 98 the field test result CDF and the distance 99 denotes the bias.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

ABBREVIATION

3GPP 3rd Generation Partnership Project
AECID Adaptive Enhanced Cell ID
A-GNSS Assisted GNSS
A-GPS Assisted GPS
CDF Cumulative Distribution Function
CDMA Code Division Multiple Access
Cell-ID Cell identity
GIS Geographic Information System
GNSS Global Navigation Satellite System
GPS Global Positioning System
GSM Global System for Mobile communications
ID IDentity
ISD Inter-Site Distance
LBS Location Based Services
LTE Long Term Evolution
OTDOA Observed Time Difference Of Arrival
RAB Radio Access Bearer
RAN Radio Access Network
RANAP Radio Access Network Application Part
RBS Radio Base Station
RF Radio Frequency
RSRQ Reference Signal Received Quality
RTT Round Trip Time
RxQual Received signal Quality
SMM Standard Macrocell Model
SPM Standard Propagation Model
TA Timing Advance
UE User Equipment
UERx-Tx UE Receiver-Transmitter
UMTS Universal Mobile Telecommunication System
UTRAN UMTS Terrestrial Radio Access Network
WCDMA Wideband CDMA

REFERENCES

[1] 3GPP TR 25.215, section 5.
[2] T. Wigren, "Adaptive enhanced cell ID fingerprinting localization by clustering of precise position measurements", IEEE Trans. Veh. Tech., vol. 56, pp. 3199-3209, 2007.

The invention claimed is:

1. A method for fingerprinting positioning decision support, comprising of:
    obtaining a geographic distribution probability of positions of measurement according to a measurement strategy;
    generating a first collection of simulated measurements according to a signal model, each simulated measurement in said first collection being associated with a respective pixel selected in dependence on said geographic distribution probability;
    said signal model being based on at least base stations located in said area or to be located in said area;
    computing fingerprinting positioning reference data from said first collection of simulated measurements and positions of said selected pixels;
    generating a second collection of simulated measurements according to said signal model, said second collection being statistically independent to said first collection, each signal of said second collection being associated with a respective intended position within said area;
    performing fingerprinting positioning by said second collection of simulated measurements utilizing said computed fingerprinting positioning reference data, giving respective estimated positions; and
    calculating an estimated accuracy of said fingerprinting positioning obtainable by said measurement strategy, using a comparison between said intended position and said estimated position for each of the measurements of said second collection, to evaluate positioning capabilities of fingerprinting positioning based on said measurement strategy.

2. The method according to claim 1, wherein said fingerprinting positioning is an adaptive enhanced cell ID positioning.

3. The method according to claim 1, wherein said step of obtaining a geographic distribution probability comprises obtaining of a digital map of an area to be covered by said fingerprinting positioning and converting said map into pixels, wherein each pixel has a value associated with a measurement probability according to said measurement strategy.

4. The method according to claim 3, wherein said value of said pixels is a binary value, whereby a first value represents pixels associated with positions where measurement is intended to be made and a second value represents pixels associated with positions where measurement is not intended to be made, according to said measurement strategy.

5. The method according to claim 4, wherein pixels corresponding to roads of the digital map are given said first value.

6. The method according to claim 4, wherein said measurement strategy is a driving test, whereby pixels of the digital map corresponding to roads accessible by driving tests are given said first value.

7. The method according to claim 1, wherein said step of generation of said second collection of simulated measurement is performed for pixels selected in dependence on said geographic distribution probability.

8. The method according to claim 1, wherein said signal model is based on at least a propagation model, said signal model being dependent on an intended position and base station locations.

9. The method according to claim 8, wherein said signal model is further dependent on at least one of:
    environment characteristics;
    minimum signal level for access; and
    terminal type.

10. The method according to claim 1, wherein said simulated measurements comprise at least one of:
   received signal strength;
   received signal quality; and
   propagation time related parameters.

11. The method according to claim 8, wherein said signal model considers the impact of random fluctuation of signal strength and minimum access signal level.

12. The method according to claim 11, wherein said signal model considers impact of a signal strength error distribution according to at least one of:
   Rayleigh distribution;
   Rician distribution;
   Gaussian distribution; and
   a statistical distribution obtained from historical data within said area.

13. The method according to claim 8, wherein said signal model is at least one of:
   cell specific;
   geographical area specific;
   terrain specific;
   GIS data specific; and
   time specific.

14. The method according to claim 1, further comprising:
   calibrating said estimated accuracy by a bias, said bias being computed by comparing estimated accuracy from simulations and real measured accuracy in a comparison area where both are available.

15. The method according to claim 1, wherein said intended positions are selected according to at least one of:
   expected user behaviour;
   expected user distribution;
   randomly; and
   in hotspots.

16. A system for fingerprinting positioning decision support, the system comprising:
   a processor;
   an input for geographical data, connected to said processor, said input for geographical data being configured to obtain a geographical data of an area to be covered by said fingerprinting positioning;
   an input for cell planning data, connected to said processor; and
   an output connected to said processor, for an estimated accuracy of a fingerprinting positioning;
   said processor being configured to obtain a geographic distribution probability of positions of measurement according to a measurement strategy;
   said processor further comprising a measurement simulator;
   said measurement simulator being configured to generate a first collection of simulated measurements according to a signal model, each simulated measurement in said first collection being associated with a respective pixel selected in dependence on said geographic distribution probability;
   said signal model being based on at least base stations located in said area or to be located in said area;
   said measurement simulator being further configured to generate a second collection of simulated measurements according to said signal model, said second collection being statistically independent to said first collection, each simulated measurement of said second collection being associated with a respective intended position within said area;
   said processor further comprising a fingerprinting positioning part;
   said fingerprinting positioning part being configured to compute fingerprinting positioning reference data from said first collection of simulated measurements and positions of associated said pixels;
   said fingerprinting positioning part being further configured to perform fingerprinting positioning by said second collection of simulated measurements utilizing said computed fingerprinting positioning reference data, giving respective estimated positions;
   said processor being further configured to calculate said estimated accuracy of said fingerprinting positioning obtainable by said measurement strategy, using a comparison between said intended position and said estimated position for each of the simulated measurements of said second collection.

* * * * *